US011297161B1

United States Patent
Liu et al.

(10) Patent No.: US 11,297,161 B1
(45) Date of Patent: Apr. 5, 2022

(54) SYSTEMS AND METHODS FOR MANAGING AN AUTOMOTIVE EDGE COMPUTING ENVIRONMENT

(71) Applicant: Toyota Motor Engineering & Manufacturing North America, Inc., Plano, TX (US)

(72) Inventors: Yin-Chen Liu, Mountain View, CA (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/065,903

(22) Filed: Oct. 8, 2020

(51) Int. Cl.
  *G06F 15/173* (2006.01)
  *H04L 67/63* (2022.01)
  *H04L 67/12* (2022.01)
  *H04L 47/50* (2022.01)

(52) U.S. Cl.
  CPC ............ *H04L 67/327* (2013.01); *H04L 47/50* (2013.01); *H04L 67/12* (2013.01)

(58) Field of Classification Search
  CPC ........ H04L 67/327; H04L 47/50; H04L 67/12
  See application file for complete search history.

(56) References Cited

U.S. PATENT DOCUMENTS

| 10,966,069 | B1 | 3/2021 | Liu et al. |
| 2019/0116128 | A1* | 4/2019 | Guo .................... H04L 67/1008 |
| 2019/0364492 | A1 | 11/2019 | Azizi et al. |

(Continued)

FOREIGN PATENT DOCUMENTS

CN  111614745 A  * 9/2020

OTHER PUBLICATIONS

Gangadharan et al., "Bandwidth Optimal Data/Service Delivery for Connected Vehicles via Edges," Computer Engineering Commons, Department of Computer & Information Science, University of Pennsylvania, 2018, found at https://repository.upenn.edu/cgi/viewcontent.cgi?article=1896&context=cis_papers.

(Continued)

*Primary Examiner* — Cheikh T Ndiaye

(74) *Attorney, Agent, or Firm* — Christopher G. Darrow; Darrow Mustafa PC

(57) ABSTRACT

Systems and methods described herein relate to managing an automotive edge computing environment. One embodiment receives current status information from one or more edge servers; receives and queues requested computing tasks from one or more connected vehicles; selects, as an optimization trigger number N, a largest number of requested computing tasks for which an optimization process can be completed within a time, per requested computing task, that is less than an average time gap between the requested computing tasks; performs the optimization process when a number of queued requested computing tasks exceeds the optimization trigger number N, wherein the optimization process produces an updated data transfer schedule and an updated data process schedule for N queued requested computing tasks; and transmits the updated data transfer schedule and the updated data process schedule to the one or more edge servers and the one or more connected vehicles.

20 Claims, 3 Drawing Sheets

(56) References Cited

U.S. PATENT DOCUMENTS

2020/0272509 A1* 8/2020 Wright .................. G06F 9/5038

OTHER PUBLICATIONS

Elbamby et al., "Wireless Edge Computing with Latency and Reliability Guarantees," arXiv:1905.05316v1, May 13, 2019, found at https://arxiv.org/pdf/1905.05316.pdf.

Liu et al., "Vehicular Edge Computing and Networking: A Survey," arXiv:1908.06849v1, Jul. 25, 2019, found at https://arxiv.org/pdf/1908.06849.pdf.

Sudheera, Software Defined Networking Approach for Efficient Information Dissemination in Vehicular Networks, Ph. D. thesis submitted to Nanyang Technological University, Singapore, Jul. 29, 2019, found at https://dr.ntu.edu.sg/bitstream/10356/137888/2/Thesis%20Final%20Submit%20Unsecure.pdf.

Varshney et al., "Characterizing Application Scheduling on Edge, Fog and Cloud Computing Resources," arXiv:1904.10125v1, Apr. 23, 2019, found at https://arxiv.org/pdf/1904.10125.pdf.

Zhang et al., "Optimal delay constrained offloading for vehicular edge computing networks," 2017 IEEE International Conference on Communications (ICC), May 2017, pp. 2603-2608.

Gangadharan et el., "Bandwidth optimal data/service delivery for connected vehicles via edges," IEEE International Conference on Cloud Computing (CLOUD 2018). Jul. 2018, 10 pages.

Emara et al., "MEC-assisted End-to-End Latency Evaluations for C-V2X Communications," 5 pages, arXiv:1802 08027v1 [eess.SP] Feb. 22, 2018.

Unknown, "New York City Mobility Report," NYC Department of Transportation, Jun. 2018, accessed at: https://www1.nyc.gov/html/dot/html/about/mobilityreport.shtml (last accessed: Oct. 29, 2021), 42 pages.

Unknown, "AT&T Official Site—Unlimited Data Plans, Internet Service, & TV," Accessed at: https://www.att.com/ (last accessed: Oct. 29, 2021), 6 pages.

Unknown, "Switch to Xfinity today and get up to a $300 Visa Card," Accessed at: https://www.xfinity.com/overview (last accessed: Oct. 29, 2021), 10 pages.

Unknown, "Speedtest by Ookla—The Global Braodband Speed Test," Accessed at: https://www.speedtest.net/ (last accessed: Oct. 29, 2021), 2 pages.

Unknown, "Cloud Services—Amazon Web Services (AWS)," Accessed at: https://aws.amazon.com/ (last accessed Oct. 29, 2021), 15 pages.

Unknown, "USDOT ITS Research—Connected Vehicle Pilot Deployment Program," Accessed at: https://www.its.dot.gov/pilots/index.htm (last accessed: Oct. 29, 2021), 5 pages.

Unknown, "Traffic volume Counts (2012-2013) | NYC Open Data," Accessed at: https://data.cityofnewyork.us/Transportation/Traffic-Volume-Counts 2012-2013-/p424-amsu (last accessed: Oct. 29, 2021), 6 pages.

Miettinen et al., "Energy efficiency of mobile clients in cloud computing," in HotCloud, 2010, 7 pages.

Liu et al., "Delay-optimal computation task scheduling for mobile-edge computing system," 8 pages, arXiv:1604 07525V3 [cs.IT] May 10, 2016.

U.S. Appl. No. 17/018,396, filed Sep. 11, 2020 to Liu, titled, "Systems and Methods for Dynamic Prediction and Optimization of Edge Server Scheduling".

Sasaki et al., "Vehicle Control System Coordinated Between Cloud and Mobile Edge Computing," 6 pages, Proceedings of the SICE Annual Conference 2016.

* cited by examiner

SYSTEMS AND METHODS FOR MANAGING AN AUTOMOTIVE EDGE COMPUTING ENVIRONMENT

TECHNICAL FIELD

The subject matter described herein relates in general to edge computing and, more specifically, to systems and methods for managing an automotive edge computing environment.

BACKGROUND

As modern automotive services become more sophisticated, it becomes more challenging for in-vehicle systems to support their execution due to limited computational power and storage. Consequently, one important trend in the automotive industry is to provide such services in collaboration with infrastructures, such as edge or cloud servers, via communication technologies that include, for example, Vehicle-to-Vehicle (V2V), Vehicle-to-Infrastructure (V2I), and Vehicle-to-Cloud servers (V2C). However, it is nontrivial to meet diverse requirements with this kind of collaborative computing unless an appropriate scheduling approach is included. Otherwise, an unbalanced workload distribution, longer latency, and unnecessary cost can result.

SUMMARY

Embodiments of a system for managing an automotive edge computing environment are presented herein. In one embodiment, the system comprises one or more processors and a memory communicably coupled to the one or more processors. The memory stores an input module including instructions that when executed by the one or more processors cause the one or more processors to receive current status information from one or more edge servers. The memory also stores an optimization trigger module including instructions that when executed by the one or more processors cause the one or more processors to receive and queue requested computing tasks from one or more connected vehicles and to select, as an optimization trigger number N, a largest number of requested computing tasks for which an optimization process can be completed within a time, per requested computing task, that is less than an average time gap between the requested computing tasks. The memory also stores an optimization module including instructions that when executed by the one or more processors cause the one or more processors to perform the optimization process when a number of queued requested computing tasks exceeds the optimization trigger number N, wherein the optimization process produces an updated data transfer schedule and an updated data process schedule for N queued requested computing tasks. The memory also stores a communication module including instructions that when executed by the one or more processors cause the one or more processors to transmit the updated data transfer schedule and the updated data process schedule to the one or more edge servers and the one or more connected vehicles.

Another embodiment is a non-transitory computer-readable medium for managing an automotive edge computing environment and storing instructions that when executed by one or more processors cause the one or more processors to receive current status information from one or more edge servers. The instructions also cause the one or more processors to receive and queue requested computing tasks from one or more connected vehicles. The instructions also cause the one or more processors to select, as an optimization trigger number N, a largest number of requested computing tasks for which an optimization process can be completed within a time, per requested computing task, that is less than an average time gap between the requested computing tasks. The instructions also cause the one or more processors to perform the optimization process when a number of queued requested computing tasks exceeds the optimization trigger number N, wherein the optimization process produces an updated data transfer schedule and an updated data process schedule for N queued requested computing tasks. The instructions also cause the one or more processors to transmit the updated data transfer schedule and the updated data process schedule to the one or more edge servers and the one or more connected vehicles.

Another embodiment is a method of managing an automotive edge computing environment, the method comprising receiving current status information from one or more edge servers. The method also includes receiving and queueing requested computing tasks from one or more connected vehicles. The method also includes selecting, as an optimization trigger number N, a largest number of requested computing tasks for which an optimization process can be completed within a time, per requested computing task, that is less than an average time gap between the requested computing tasks. The method also includes performing the optimization process when a number of queued requested computing tasks exceeds the optimization trigger number N, wherein the optimization process produces an updated data transfer schedule and an updated data process schedule for N queued requested computing tasks. The method also includes transmitting the updated data transfer schedule and the updated data process schedule to the one or more edge servers and the one or more connected vehicles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
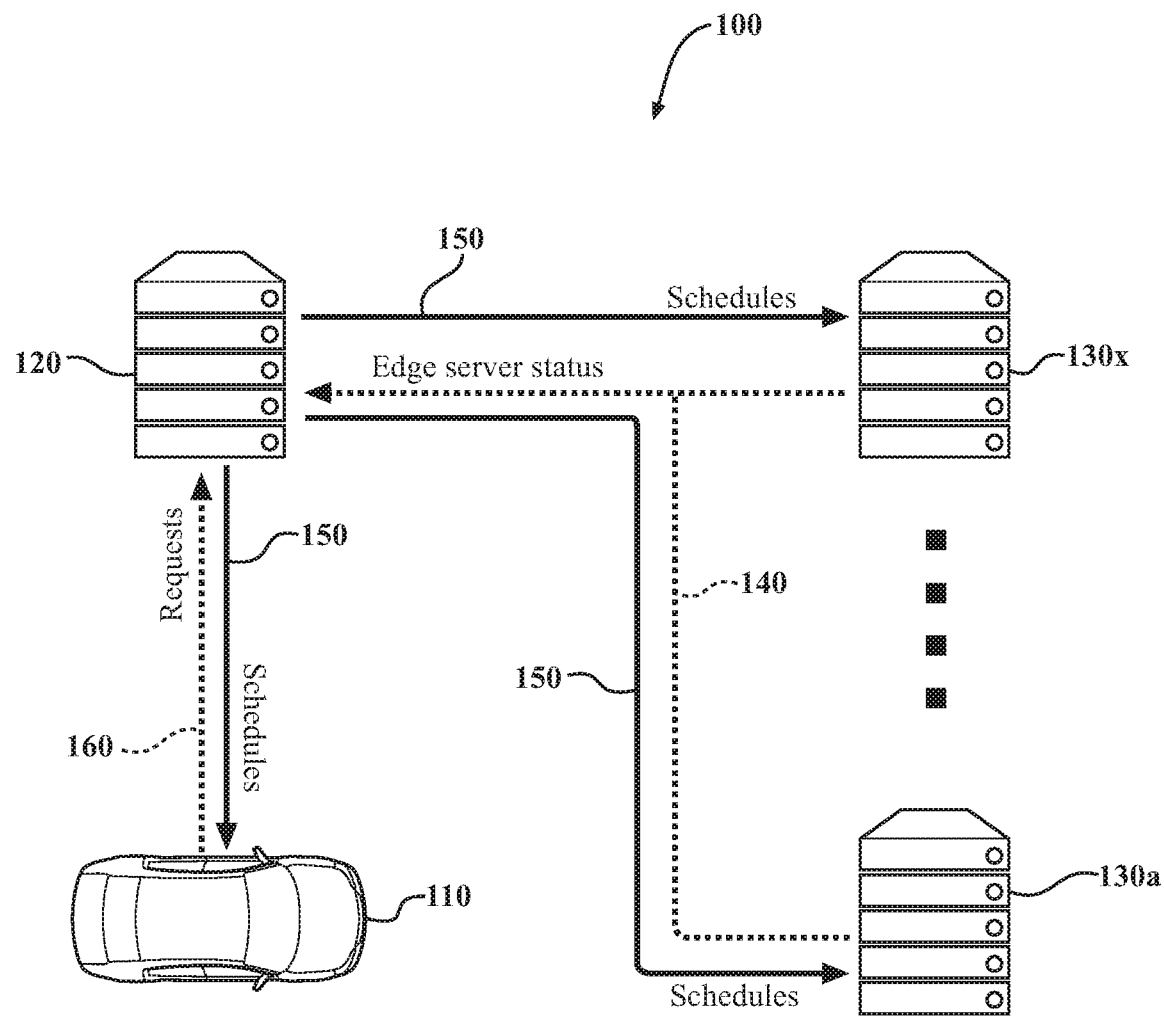
FIG. 1 illustrates an automotive edge computing environment, in accordance with an illustrative embodiment of the invention.

Various embodiments described herein of systems and methods for managing an automotive edge computing environment provide a framework that automatically generates two types of optimal schedules, one to transmit data among different machines (e.g., vehicles, edge servers, and cloud servers) over a network (a "data transfer schedule"), and another to compute workloads within a given machine in a way that guarantees the optimality of the data transmission and processing in terms of overall cost without causing overload of the communication medium or the machines (a "data process schedule"). This framework automatically divides a large quantity of data into multiple smaller chunks of data that can be transmitted to or processed by a set of edge servers independently in a manner that optimizes a cost objective. The framework also automatically generates an optimal schedule of a set of sub-tasks as to which edge server should process them and when they should be processed to optimize a cost objective guaranteeing conformance of edge server resource constraints, interrelated process constraints, and process dependencies. Further, the framework provides a method to execute the optimization process efficiently at run-time to handle dynamic real-world traffic flow while maintaining a specified level of solution quality.

In various embodiments, an optimization solver server receives current status information from one or more edge servers in the automotive edge computing environment. The optimization solver server also receives and queues requested computing tasks from one or more connected vehicles. One aspect of these embodiments is determining how many queued requested computing tasks to process during a given optimization iteration. Processing more queued requested computing tasks increases the optimality of the resulting data transfer and data process schedules but at the expense of a longer solution time. The longer solution time can result in the schedules ultimately being out of date. To address this problem, the optimization solver server, in some embodiments, selects, as an optimization trigger number N, the largest number of requested computing tasks for which the optimization process can be completed within a time, per requested computing task, that is less than the average time gap between the received requested computing tasks.

In these embodiments, the optimization solver server performs the optimization process when the number of queued requested computing tasks exceeds the optimization trigger number N. The output of the optimization process is an updated data transfer schedule and an updated data process schedule for N queued requested computing tasks (e.g., in some embodiments, the first N requested computing tasks in the queue).

Once the optimization solver server has produced the updated data transfer and process schedules, the optimization solver server can transmit the schedules to the one or more edge servers and the one or more connected vehicles.

Referring to FIG. 1, it illustrates an automotive edge computing environment 100, in accordance with an illustrative embodiment of the invention. In FIG. 1, one or more connected vehicles 110 (only one connected vehicle 110 is shown in FIG. 1 for simplicity) and one or more edge servers 130 communicate with an optimization solver server 120 over network connections that can include wireless technologies, wireline technologies, or a combination of wireless and wireline technologies. For purposes of illustration, FIG. 1 depicts a plurality of X edge servers 130, of which Edge Server 1 (130a) and Edge Server X (130x) are shown. In some embodiments, each of the one or more edge servers 130 is deployed in a roadside unit (RSU), an office environment, or a residential environment (e.g., a home or apartment). In other words, the edge severs 130 can be deployed flexibly and in a variety of different environments situated near roadways.

Optimization solver server 120 receives current edge server status information 140 from each of the edge servers 130. Such edge server status information 140 can include, for example, available memory, process capacity, data transfer capacity, a current data transfer schedule, and a current data process schedule. Optimization solver server 120 also receives and queues requested computing tasks 160 from the one or more connected vehicles 110. The requested computing tasks can pertain to a wide variety of edge-computing-assisted vehicular applications. One example is downloading high-definition (HD) map data from an edge server 130. Another example is performing localization of a connected vehicle 110 based on edge-computing-assisted processing of vehicular sensor data uploaded to one or more edge servers from the connected vehicle 110. Yet another example is performing object detection and object recognition based on edge-computing-assisted processing of vehicular sensor data uploaded to one or more edge servers 130. In general, the requested computing tasks 160 pertain to at least one of (1) downloading data from the one or more edge servers 130 and (2) uploading vehicular sensor data to the one or more edge servers 130.

As discussed above, optimization solver server 120 performs an optimization process when the number of queued requested computing tasks 160 exceeds the selected optimization trigger number N to produce an updated data transfer schedule and an updated data process schedule for N queued requested computing tasks 160. In FIG. 1, schedules 150 represent the updated data transfer schedule and the updated data process schedule. This optimization process is repeated as additional requested computing tasks 160 are received and queued at optimization solver server 120. One repetition of the optimization process for a set of N queued requested computing tasks 160 is herein termed an "optimization iteration."

The remainder of this Detailed Description is organized as follows. First, in connection with FIG. 2, an overview of the functions carried out by optimization solver server 120, in various embodiments, is provided. Second, a more detailed description of the optimization process, including pertinent mathematical concepts and algorithms, is provided. Finally, a method of managing an automotive edge computing environment is discussed in connection with the flowchart of FIG. 3.

Figure 2:
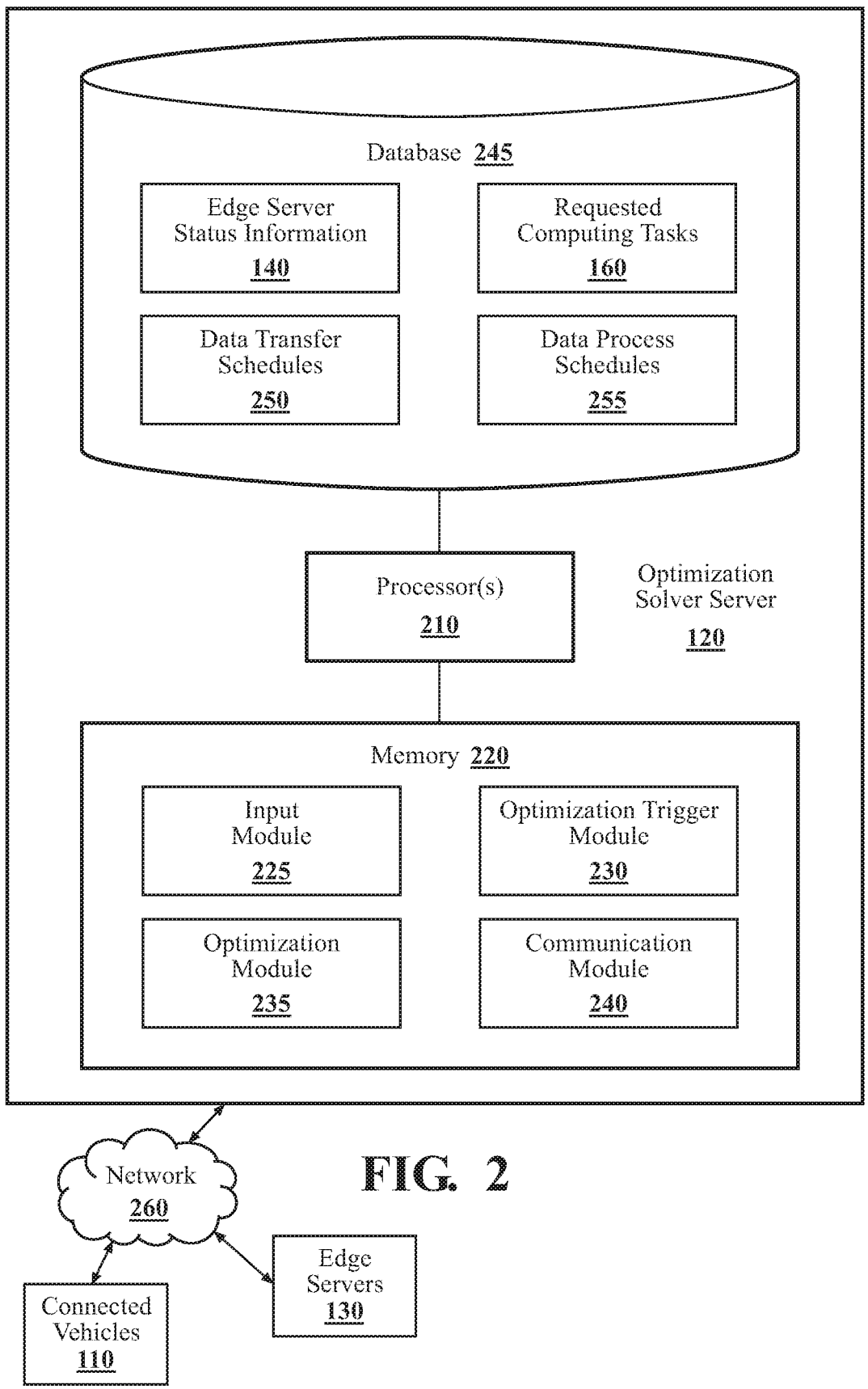
FIG. 2 is a functional block diagram of an optimization solver server for managing an automotive edge computing environment, in accordance with an illustrative embodiment of the invention.

FIG. 2 is a functional block diagram of an optimization solver server 120, in accordance with an illustrative embodiment of the invention. In FIG. 2, optimization solver server 120 includes one or more processors 210 to which a memory 220 is communicably coupled. In one embodiment, memory 220 stores an input module 225, an optimization trigger module 230, an optimization module 235, and a communication module 240. The memory 220 is a random-access memory (RAM), read-only memory (ROM), a hard-disk drive, a flash memory, or other suitable non-transitory memory for storing the modules 225, 230, 235, and 240. The modules 225, 230, 235, and 240 are, for example, computer-readable instructions that, when executed by the one or more processors 210, cause the one or more processors 210 to perform the various functions disclosed herein.

As shown in FIG. 2, the edge server status information 140 discussed above can be stored in a database 245. Database 245 can also store the requested and queued computing tasks 160 discussed above. Optimization solver server 120 can also store data transfer schedules 250 and data process schedules 255 (current and updated, upon completion of an optimization iteration) in database 245. Database 245 can be implemented using any of a variety of data storage technologies, including RAM, ROM, a hard-disk drive, a flash memory, or other suitable non-transitory memory. In some embodiments, the contents of database 245 change whenever the modules 225, 230, 235, and 240 stored in memory 220 are executed by the one or more processors 210, whereas the modules 225, 230, 235, and 240 stored in memory 220 change only when a software or firmware update is installed on optimization solver server 120.

As also shown in FIG. 2, optimization solver server 120 can communicate with connected vehicles 110 and edge servers 130 via a network 260, which can, in some embodiments, include one or more of cellular data networks, Wi-Fi networks, short-range wireless networks (e.g., Bluetooth Low Energy or "Bluetooth LE," Dedicated Short-Range Communications or "DSRC"), and the Internet.

Input module 225 generally includes instructions that when executed by the one or more processors 210 cause the one or more processors 210 to receive current status information 140 from one or more edge servers 130. As discussed above, edge server status information 140 can include, for example, available memory, process capacity, data transfer capacity, a current data transfer schedule, and a current data process schedule.

Optimization trigger module 230 generally includes instructions that when executed by the one or more processors 210 cause the one or more processors 210 to receive and queue requested computing tasks 160 from one or more connected vehicles 110. As discussed above, the requested computing tasks 160 generally pertain to at least one of (1) downloading data from the one or more edge servers 130 and (2) uploading vehicular sensor data to the one or more edge servers 130. Optimization trigger module 230 also includes instructions that when executed by the one or more processors 210 cause the one or more processors 210 to select, as an optimization trigger number N, the largest number of requested computing tasks for which an optimization process can be completed within a time, per requested computing task 160, that is less than an average time gap between the requested computing tasks 160 (i.e., the average time interval between the respective times at which the requested computing tasks 160 are received at optimization solver server 120). In some embodiments, optimization trigger module 230 includes further instructions to reduce the optimization trigger number N based, at least in part, on the urgency level associated with one or more of the queued requested computing tasks 160. Reducing the trigger number N (even to as small as 1, in some situations) permits the optimization process to be completed more rapidly, in such situations.

Optimization module 235 generally includes instructions that when executed by the one or more processors 210 cause the one or more processors 210 to perform an optimization process when the number of queued requested computing tasks 160 exceeds the optimization trigger number N, the optimization process producing an updated data transfer schedule 250 and an updated data process schedule 255 for N queued requested computing tasks 160. As mentioned above, in some embodiments, the N queued requested computing tasks 160 involved in a given optimization iteration are the first N requested computing tasks in the queue.

In some embodiments, optimization module 235 includes instructions that when executed by the one or more processors 210 cause the one or more processors 210 to (1) formulate a discrete state transition model that represents dynamics of different types of data being transferred among different network nodes and data being processed from one type to another as a function of a current data transfer schedule 250 and a current data process schedule 255; (2) formulate constraints representing resource limitations and task requirements using information including one or more of bandwidth limitations, available processor power, available memory, distances among the one or more edge servers and the one or more connected vehicles, future trajectory data pertaining to the one or more connected vehicles, and data destination information; and (3) evaluate a cost function that accounts for the discrete state transition model and the constraints to produce the updated data transfer schedule 250 and the updated data process schedule 255 for the N queued requested computing tasks 160.

In one embodiment, the updated data transfer schedule 250 includes a first set of tuples, each tuple in the first set of tuples including a rate of data transfer from a network node i to a network node j, and the updated data process schedule 255 includes a second set of tuples, each tuple in the second set of tuples including a rate of data processing from a first type of data to a second type of data. For example, in one application, the rate of data processing of interest is the rate of processing raw sensor data uploaded to an edge server 130 to obtain object detection and object recognition data. In another application, the rate of data processing of interest could be the rate of processing raw sensor data uploaded to an edge server 130 to produce vehicle localization data.

Communication module 240 generally includes instructions that when executed by the one or more processors 210 cause the one or more processors 210 to transmit the updated data transfer schedule 250 and the updated data process schedule 255 to the one or more edge servers 130 and the one or more connected vehicles 110. The one or more connected vehicles 110 and the edge servers 130 can then carry out edge-computing-assisted applications in accordance with the updated data transfer schedule 250 and the updated data process schedule 255.

This description next turns to a more detailed discussion of the optimization process carried out by optimization module 235, including pertinent mathematical concepts and algorithms. First, some important definitions and notation are provided that will be referred to later in defining some illustrative optimization algorithms. Herein, a "machine" is generally defined as a device that can produce, process, and transmit data to remote places. Examples include connected vehicles 110, edge servers 130, and cloud servers (e.g., optimization solver server 120). These machines have memory, processor(s), and communication modules to store data, process data from one type to another, and transmit data between machines. We use the notation $S(t)$ to represent the amount of data kept in each machine at time t. The data is locally processed according to the data process schedule 255, and the processed data is transmitted from one machine to another machine in accordance with the data transfer schedule 250. $L(t)$ and $P(t)$ represent the data transfer schedule 250 and the data process schedule 255, respectively. These two schedules are defined in greater detail below. A summary of some of the mathematical notation used below is provided in Table 1.

TABLE 1

| Notation | Definition |
|---|---|
| $\Omega$ | The feasible set of machine states |
| $\Psi$ | The feasible set of data transfer schedules |
| $\Gamma$ | The feasible set of data process schedules |
| $S_x(t)$ | Amount of data in the x-th machine at time t |
| $\overline{S}_x$ | Memory size of the x-th machine |
| S initial | Original amount of data in each machine at time t = 0 |
| $S_{final}$ | Amount of data desired at each machine at the end of considered time horizon |
| $t_{dk}$ | Latency incurred by the k-th link between machines |
| $L_{(x,y)}(t)$ | Data transfer rate from the x-th machine to the y-th machine at time t |
| $\overline{L}_{(x,y)}$ | Maximum rate to transfer data from the x-th machine to the y-th machine |
| $\overline{L}_{x\rightarrow}$ | Maximum total rate of transferring data out from the x-th machine |
| $\overline{L}_{x\leftarrow}$ | Maximum total rate of transferring data to the x-th machine |
| $A_{(x,y)}$ | Connection availability indicator |
| $P_x(t)$ | Data process rate at the x-th machine at time t |
| $\overline{P}_x$ | Maximum amount of computation resources the x-th machine can provide |
| $E_{(m,n)}$ | The amount of computation resources required to process one unit of data from m-th type to n-th type |
| $R_{(m,n)}$ | Size of n-th type of data when converted from unit size of m-th type of data |
| $O_{(m,n)}$ | Amount of data needed to start processing data from m-th type to n-th type |
| $H_S(S_x(t))_m$ | Amount of the m-th type data in the x-th machine at time t |
| $H_L(L_{(x,y)}(t))_m$ | Data transfer rate of the m-th type of data from the x-th machine to the y-th machine at time t |
| $H_P(P_x(t))_{(m,n)}$ | Data process rate of converting the m-th type of data to the n-th type of data in the x-th machine at time t |
| $C_{(x,y)}$ | Price of transmitting one unit of data from the x-th machine to the y-th machine |
| $D_{(m,n,x)}$ | Price of processing one unit of m-th type of data to n-th type of data at the x-th machine |

A data transfer schedule L (t) is a set of tuples as follows:

$$L(t) = \{L_{A\rightarrow B}, L_{A\rightarrow C}, L_{A\rightarrow D} \ldots L_{B\rightarrow A}, L_{B\rightarrow C}, L_{B\rightarrow D} \ldots \},$$

Where each tuple $L_{i\rightarrow j}$ represents the rate of data transfer from machine i to machine j. The number of elements in $L_{i\rightarrow j}$ is equal to the number of data types involved in each task, each element in $L_{i\rightarrow j}$ representing the transfer rate of a specific type of data for a specific task.

A data process schedule P(t) is a set of tuples as follows: $P(t) = \{P_A, P_B, \ldots\}$, where each tuple $P_k$ represents the rate of data processing from one type to another, the number of elements in each tuple being equal to the number of types of data processing permitted in connection with each task.

In some embodiments, the objective is, given an initial amount of data S(0), a desired final data amount S(T), and a feasible set of states ($\Omega$) and schedules ($\Psi$ and $\Gamma$), to determine an optimal data transfer schedule $\hat{L}(T)$ and an optimal data process schedule $\hat{P}(t)$ that complete the data transfer and data process tasks while minimizing the cost of interest. To avoid the resulting schedules becoming outdated, the optimization trigger number N is selected to obtain optimal schedules within a reasonable amount of time, as discussed further below.

For these embodiments, an optimization problem is formulated by introducing the system dynamics, optimization constraints, and objective functions to generate the optimized data transfer schedule $\hat{L}(T)$ and optimized data process schedule $\hat{P}(t)$.

System Dynamics

Two types of actions, the data transfer schedule L(t) and the data process schedule P(t), change the amount of data stored in S(t). L(t) contains the data transfer rate of all data types between all machines at time t, and P(t) contains the rate of all admissible data processing in every machine that converts data from one type to another. In one embodiment, a single integrator system with input latency as follows describes the dynamics of the data stored in the memory of each machine:

$$\dot{S}(t) = f(L(t), P(t)) + \Sigma_{k=1}^{K} J_k(L(t-t_{d_k})),$$

where f(L(t),P(t)) is the part of system dynamics without latency. The dynamic of the m-th type of data stored in the x-th machine can be represented as follows:

$$f(L(t), P(t))_{(x,m)} = \sum_{n} R_{(n,m)} \cdot H_P(P_x(t))_{(n,m)} - \sum_{q}^{n} H_P(P_x(t))_{(m,q)} - \sum_{y}^{q} H_L(L_{(x,y)}(t))_m.$$

The remaining part of the system dynamic is the part that includes network latency. For connected services that retrieve or upload data to the remote servers, the latency can significantly affect safety or performance of the service. Therefore, it is important to account for latency in the state-transition model. In some embodiments, the dynamic of the m-th type of data stored in the x-th machine that is delayed due to network latency introduced by the k-th link is formulated as follows:

$$J_k(L(t))_{(x,m)} = \begin{cases} H_L(L_{(y,x)}(t))_m, & \text{if } k\text{-th link connects } x\text{-th and } y\text{-th machine,} \\ 0, & \text{otherwise.} \end{cases}$$

The system dynamics described above not only describes how data flows in an automotive edge computing environment 100. It also serves as a solution to the dependency issue of multiple processes within the same data transfer and process task. The concept of process dependency is next defined.

Process $H_P(P_x(t))_{(m,n)}$ and process $H_P(P_x(t))_{(q,r)}$ are in a process dependency relation if process $H_P(P_x(t))_{(m,n)}$ needs to be completed before process $H_P(P_x(t))_{(q,r)}$ or vice versa. Skipping or switching the execution order of the processes is not an option, in such a case. For example, in a HD-map-generation task, the raw vehicular sensor data first passes through the sensor data fusion process in which the raw sensor data is processed and combined. Once sensor data fusion is complete, an edge server 130 can proceed to perform three-dimensional (3D) object location detection and semantics/attributes extraction. Thus, there is a process dependency relation between HD map generation and the sensor fusion process. In some embodiments, two rules are applied to resolve process-dependency issues. First, processes that violate process-dependency relationships are not included in a data process schedule P(t). Second, all elements in S(t) are constrained to be larger than or equal to zero such that if the schedule switches the order of processes, it creates negative elements in S(t), violating the constraint.

Resource Constraints

Due to the limited resources of each machine, the amount of data a machine can hold in memory, transmit, or process within a certain time period is limited. Resource constraints are formulated such that the obtained data transfer and process schedules consume an amount of resources that is less than or equal to the available resources.

The memory constraint sets the upper bound for the total amount of data stored in the memory of each machine. The constraint on the total amount of data stored in the x-th machine can be formalized as follows: $\Sigma_m H_S(S_x(t))_m \leq \bar{S}_x$.

The processor power constraint is formalized in a similar fashion to ensure that the resulting data process schedule 255 does not exceed the processing capability of the x-th machine: $\Sigma_{m,n} H_P(P_x(t))_{(m,n)} \cdot \Sigma_{(m,n)} \leq \bar{P}_x$.

Depending on the communication protocol, media, and environment, different communication links between machines may have different bandwidth limitations. In some embodiments, two types of bandwidth limitations are considered. The first is the bandwidth limitation between specific machines. This constraint sets the upper bound for data transfer rate between the x-th and y-th machines as follows: $\Sigma_m H_L(L_{(x,y)}(t))_m \leq \bar{L}_{(x,y)}$. Aside from the bandwidth limitation for each individual link, the total amount of data one machine can receive or send out within a certain time period is also constrained by the capability of its communication module. To ensure that the resulting data transfer schedule 250 does not assign data transmission tasks to communication modules that exceed their communication capabilities, some embodiments constrain the total amount of data the x-th machine can receive or send within a certain time period as follows: $\Sigma_{m,y} H_L(L_{(x,y)}(t))_m \leq \bar{L}_{x \rightarrow}$, and $\Sigma_{m,y} H_L(L_{(y,x)}(t))_m \leq \bar{L}_{x \leftarrow}$.

In these embodiments, it is assumed that connected vehicles 110 are able to transmit data to or from a given edge server 130 only when they are within the communication range of that edge server 130. The size of that range depends on the specifications of the communication module of each edge server 130. To formalize a communication-range-of-edge-servers constraint, a connection availability indicator $A_{(x,y)}$ is defined as follows:

$$A_{(x,y)}(t) = \begin{cases} 0, & \text{if } x\text{-th machine is within range of } y\text{-th machine,} \\ 1, & \text{otherwise.} \end{cases}$$

For a situation in which the x-th machine is a connected vehicle 110 and the y-th machine is an edge server 130 or vice versa, the communication constraint can be expressed as follows:

$$H_L(L_{(x,y)}(t))_m \cdot A_{(x,y)} = 0 \; \forall m.$$

In some data-processing situations, processing a chunk of data from one type to another requires information from other data chucks. An interrelated data process can be defined as follows: Process $H_P(P_x(t))_{(m,n)}$ is an interrelated process if it requires information from the original data to proceed with processing. For example, in an object recognition process, all of the information in the merged vehicular sensor data is needed to perform object recognition, since performing object recognition on partial information could result in failure to detect some objects in a scene.

For interrelated data processes, it is not possible to carry out the processes in parallel in multiple machines, and the following constraint is used, in these embodiments, to describe such a situation:

$$H_P(P_x)_{(m,n)} \cdot \left[ H_S(S_x)_m + \frac{H_S(S_x)_n}{R_{(m,n)}} - O_{(m,n)} \right] = 0,$$

for all machines x and interrelated-process corresponding data type numbers m and n. Under this constraint, if any data for the interrelated process (that processes data from the m-th type to the n-th type) is located in machines other than the x-th machine, the process schedule for the interrelated process is constrained to zero until sufficient data is located in the x-th machine.

Optimization Objectives

Next, a cost function is defined to evaluate and find the best solution among all possible solutions. There are multiple possible choices for the objective of interest, such as price for utilizing machine components (e.g. data transmission module and processor), total time consumption for completing the task, and workload balancing among edge servers 130. In one embodiment, the cost function is based on the total price for utilizing machine components. An objective function for minimizing the total price for utilizing machine components can be expressed as follows:

$$cost(L(t), P(t)) = \sum_{x,y,m} H_L(L_{(x,y)}(t))_m \cdot C_{(x,y)} + \sum_{x,m,n} H_L(L_{(x,y)}(t))_m \cdot D_{(m,n)}.$$

The optimization problem to be solved can then be expressed as follows:

$$\min_{L(t),P(t)} \sum_{t=0}^{T} cost(L(t), P(t)),$$

subject to $S(0)=S_{initial}$, $S(T)=S_{final}$, the system dynamics discussed above, and the constraints discussed above.

Optimization Trigger and Deployment

As discussed above, an optimization solver server 120 that is connected to one or more edge servers 130 (refer to FIG. 1) can obtain current edge server status information 140 including available memory, process capacity, data transfer capacity, a current data transfer schedule 250 and a current data process schedule 255. When the optimization solver server 120 receives requested computing tasks 160 from connected vehicles 110 implicating the data transfer and data process schedules, those requests are stored in and remain in a queue until the optimization process is triggered. Once the optimization process has been triggered, the optimization solver server 120 will obtain current edge server status, perform the optimization process, and return the resultant updated data transfer and data process schedules to corresponding edge servers 130 and connected vehicles 110 (refer, once again, to FIG. 1). There are many ways of designing such trigger. In this embodiment, an example is shown in which the number of requests (160) in the queue is used as a trigger for the optimization process.

The optimization trigger number N represents the number of tasks included and solved in one optimization iteration. As discussed above, once the number of requests (160) in the queue is larger than trigger number N, an optimization process is initiated in which optimization module 235 solves the optimal data transfer and data process schedules for the first N requests in the queue. As explained above, communication module 240 then sends the resulting data transfer and data process schedules (250 and 255) back to the corresponding edge servers 130 and connected vehicles 110. Once the current optimization iteration has been completed, those N requests are removed from the queue, and the cycle repeats. The process of solving for optimized data transfer and data process schedules is summarized below as Algorithm 1.

---
Algorithm 1: Solving for multiple optimal schedules with optimization trigger number N
---
Input: Ω, Ψ, Γ, N, and Task Queue
while size(Task Queue) > N do
   Get S(0) from server machines and vehicles involved in first N tasks;
   Get S(T) from task information;
   Solve for $\hat{L}(T)$ and $\hat{P}(t)$;
   Update Ω, Ψ, Γ;
   Remove first N tasks from Task Queue;
   Send $\hat{L}(T)$ and $\hat{P}(t)$ to corresponding vehicles and edge servers;
end

---

To select an optimization trigger number N that permits the optimization process to be completed quickly enough and returns a good schedule in terms of the cost of interest, this embodiment also employs Algorithm 2 to find the largest applicable optimization trigger number N based on the average time gap, $t_{req}$, between requested computing tasks 160 received from the connected vehicles 110. Algorithm 2 is summarized below.

---
Algorithm 2: Select the largest optimization trigger number N that solves the optimization problem faster than $t_{req}$ per task
---
Input: Ω, Ψ, Γ, $t_{req}$, and Task Queue
N = 1;
do
   Start timer;
   Solve optimization Algorithm 1;
   Stop timer;
   $t_{ave} = {timeconsumed}/{numberoftaskssolved}$;
   N = N + 1;
while $t_{ave} < t_{req}$;
Output: N − 2

---

A Method of Managing an Automotive Edge Computing Environment

Figure 3:
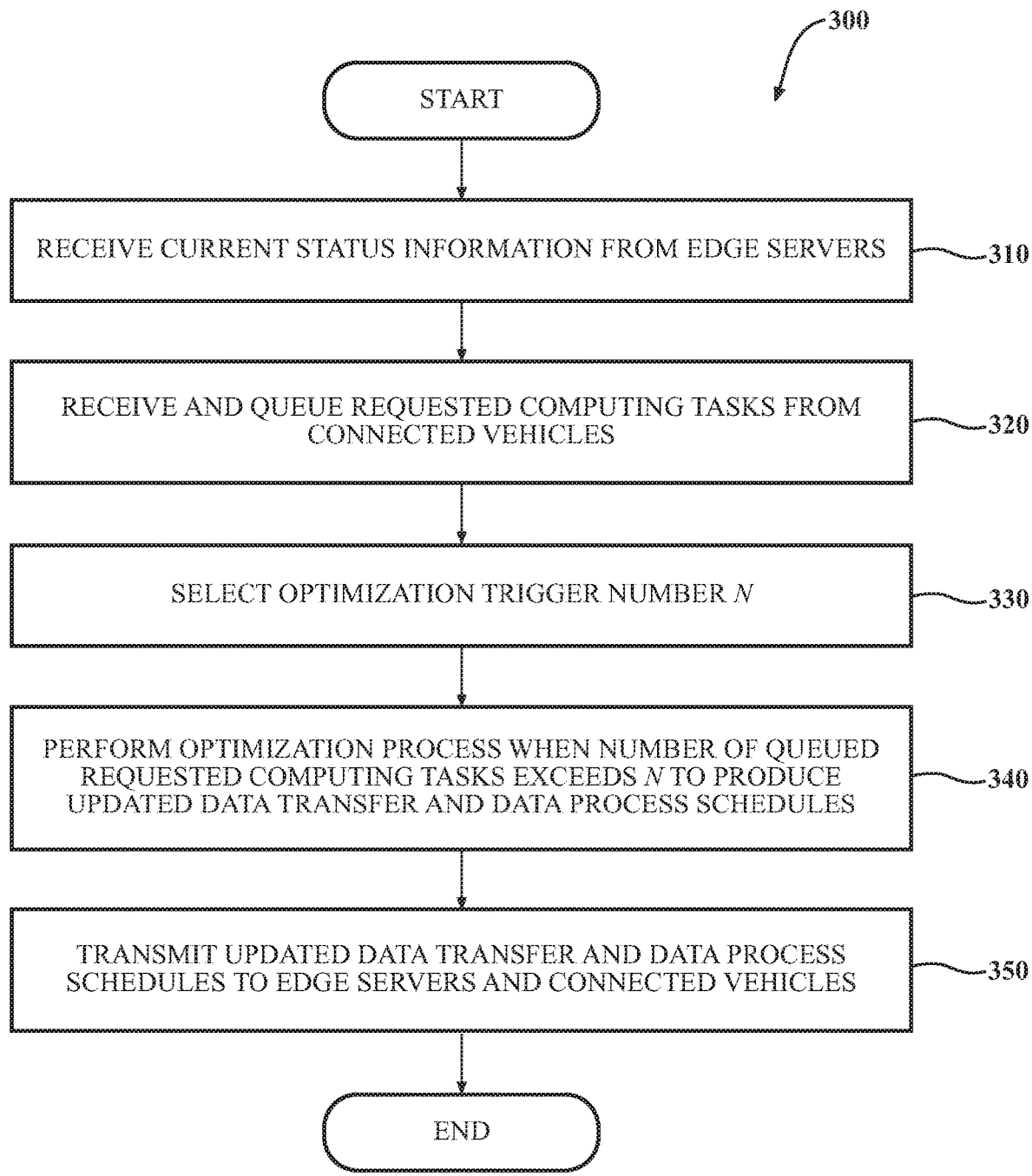
FIG. 3 is a flowchart of a method of managing an automotive edge computing environment, in accordance with an illustrative embodiment of the invention.

FIG. 3 is a flowchart of a method 300 of managing an automotive edge computing environment, in accordance with an illustrative embodiment of the invention. Method 300 will be discussed from the perspective of the optimization solver server 120 in FIG. 2. While method 300 is discussed in combination with optimization solver server 120, it should be appreciated that method 300 is not limited to being implemented within optimization solver server 120, but optimization solver server 120 is instead one example of a system that may implement method 300.

At block 310, input module 225 receives current status information 140 from one or more edge servers 130. As discussed above, edge server status information 140 can include, for example, available memory, process capacity, data transfer capacity, a current data transfer schedule, and a current data process schedule for the edge server 130 in question.

At block 320, optimization trigger module 230 receives and queues requested computing tasks 160 from one or more connected vehicles 110. As discussed above, the requested computing tasks 160 generally pertain to at least one of (1) downloading data from the one or more edge servers 130 (e.g., downloading HD map data) and (2) uploading vehicular sensor data to the one or more edge servers 130 (e.g., processing sensor data for object detection and object recognition).

At block 330, optimization trigger module 230 selects, as an optimization trigger number N, the largest number of requested computing tasks 160 for which an optimization process can be completed within a time, per requested computing task 160, that is less than an average time gap between the requested computing tasks 160. This is discussed in greater detail above.

At block 340, optimization module 235 performs the optimization process when the number of queued requested computing tasks 160 exceeds the optimization trigger number N, wherein the optimization process produces an updated data transfer schedule 250 and an updated data process schedule 255 for N queued requested computing tasks 160. As mentioned above, in some embodiments, the N queued requested computing tasks 160 involved in a given optimization iteration are the first N requested computing tasks in the queue.

As also discussed above, in some embodiments, optimization module 235 includes instructions that when executed by the one or more processors 210 cause the one or more processors 210 to (1) formulate a discrete state transition model that represents dynamics of different types of data being transferred among different network nodes and data being processed from one type to another as a function of a current data transfer schedule 250 and a current data process schedule 255; (2) formulate constraints representing resource limitations and task requirements using information including one or more of bandwidth limitations, available processor power, available memory, distances among the one or more edge servers and the one or more connected vehicles, future trajectory data pertaining to the one or more connected vehicles, and data destination information; and (3) evaluate a cost function that accounts for the discrete state transition model and the constraints to produce the updated data transfer schedule 250 and the updated data process schedule 255 for the N queued requested computing tasks 160.

As also discussed above, in one embodiment, the updated data transfer schedule 250 includes a first set of tuples, each tuple in the first set of tuples including a rate of data transfer from a network node i to a network node j, and the updated data process schedule 255 includes a second set of tuples, each tuple in the second set of tuples including a rate of data processing from a first type of data to a second type of data. For example, in one application, the rate of data processing of interest is the rate of processing raw sensor data uploaded to an edge server 130 to obtain object detection and object recognition data. In another application, the rate of data processing of interest could be the rate of processing raw sensor data uploaded to an edge server 130 to produce vehicle localization data.

At block 350, communication module 240 transmits the updated data transfer schedule 250 and the updated data process schedule 255 to the one or more edge servers 130 and the one or more connected vehicles 110. As discussed above, the one or more connected vehicles 110 and the edge servers 130 can then carry out edge-computing-assisted applications in accordance with the updated data transfer schedule 250 and the updated data process schedule 255.

In some embodiments, method 300 also includes optimization trigger module 230 reducing the optimization trigger number N based, at least in part, on an urgency level associated with one or more of the queued requested computing tasks 160, as discussed above.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for managing an automotive edge computing environment, the system comprising:
   one or more processors; and
   a memory communicably coupled to the one or more processors and storing:
      an input module including instructions that when executed by the one or more processors cause the one or more processors to receive current status information from one or more edge servers;

an optimization trigger module including instructions that when executed by the one or more processors cause the one or more processors to:

receive and queue requested computing tasks from one or more connected vehicles; and select, as an optimization trigger number N, a largest number of requested computing tasks for which an optimization process can be completed within a time, per requested computing task, that is less than an average time gap between the requested computing tasks;

an optimization module including instructions that when executed by the one or more processors cause the one or more processors to perform the optimization process when a number of queued requested computing tasks exceeds the optimization trigger number N, wherein the optimization process produces an updated data transfer schedule and an updated data process schedule for N queued requested computing tasks; and a communication module including instructions that when executed by the one or more processors cause the one or more processors to transmit the updated data transfer schedule and the updated data process schedule to the one or more edge servers and the one or more connected vehicles.

2. The system of claim 1, wherein the current status information includes one or more of available memory, process capacity, data transfer capacity, a current data transfer schedule, and a current data process schedule.

3. The system of claim 1, wherein the requested computing tasks pertain to at least one of downloading data from the one or more edge servers and uploading vehicular sensor data from the one or more connected vehicles to the one or more edge servers.

4. The system of claim 1, wherein the optimization module includes instructions that when executed by the one or more processors cause the one or more processors to:

formulate a discrete state transition model that represents dynamics of different types of data being transferred among different network nodes and data being processed from one type to another as a function of a current data transfer schedule and a current data process schedule;

formulate constraints representing resource limitations and task requirements using information including one or more of bandwidth limitations, available processor power, available memory, distances among the one or more edge servers and the one or more connected vehicles, future trajectory data pertaining to the one or more connected vehicles, and data destination information; and evaluate a cost function that accounts for the discrete state transition model and the constraints to produce the updated data transfer schedule and the updated data process schedule for the N queued requested computing tasks.

5. The system of claim 1, wherein the updated data transfer schedule includes a first set of tuples, each tuple in the first set of tuples including a rate of data transfer from a first network node to a second network node, and the updated data process schedule includes a second set of tuples, each tuple in the second set of tuples including a rate of data processing from a first type of data to a second type of data.

6. The system of claim 1, wherein the optimization trigger module includes further instructions to reduce the optimization trigger number N based, at least in part, on an urgency level associated with one or more of the queued requested computing tasks.

7. The system of claim 1, wherein each of the one or more edge servers is deployed in one of a roadside unit (RSU), an office environment, and a residential environment.

8. A non-transitory computer-readable medium for managing an automotive edge computing environment and storing instructions that when executed by one or more processors cause the one or more processors to:

receive current status information from one or more edge servers;

receive and queue requested computing tasks from one or more connected vehicles;

select, as an optimization trigger number N, a largest number of requested computing tasks for which an optimization process can be completed within a time, per requested computing task, that is less than an average time gap between the requested computing tasks;

perform the optimization process when a number of queued requested computing tasks exceeds the optimization trigger number N, wherein the optimization process produces an updated data transfer schedule and an updated data process schedule for N queued requested computing tasks; and transmit the updated data transfer schedule and the updated data process schedule to the one or more edge servers and the one or more connected vehicles.

9. The non-transitory computer-readable medium of claim 8, wherein the current status information includes one or more of available memory, process capacity, data transfer capacity, a current data transfer schedule, and a current data process schedule.

10. The non-transitory computer-readable medium of claim 8, wherein the requested computing tasks pertain to at least one of downloading data from the one or more edge servers and uploading vehicular sensor data from the one or more connected vehicles to the one or more edge servers.

11. The non-transitory computer-readable medium of claim 8, wherein the instructions to perform the optimization process include instructions that when executed by the one or more processors cause the one or more processors to:

formulate a discrete state transition model that represents dynamics of different types of data being transferred among different network nodes and data being processed from one type to another as a function of a current data transfer schedule and a current data process schedule;

formulate constraints representing resource limitations and task requirements using information including one or more of bandwidth limitations, available processor power, available memory, distances among the one or more edge servers and the one or more connected vehicles, future trajectory data pertaining to the one or more connected vehicles, and data destination information; and evaluate a cost function that accounts for the discrete state transition model and the constraints to produce the updated data transfer schedule and the updated data process schedule for the N queued requested computing tasks.

12. The non-transitory computer-readable medium of claim 8, wherein the updated data transfer schedule includes a first set of tuples, each tuple in the first set of tuples including a rate of data transfer from a first network node to a second network node, and the updated data process schedule includes a second set of tuples, each tuple in the second set of tuples including a rate of data processing from a first type of data to a second type of data.

13. The non-transitory computer-readable medium of claim 8, further including instructions that when executed by the one or more processors cause the one or more processors to reduce the optimization trigger number N based, at least in part, on an urgency level associated with one or more of the queued requested computing tasks.

14. A method of managing an automotive edge computing environment, the method comprising:
   receiving current status information from one or more edge servers;
   receiving and queueing requested computing tasks from one or more connected vehicles;
   selecting, as an optimization trigger number N, a largest number of requested computing tasks for which an optimization process can be completed within a time, per requested computing task, that is less than an average time gap between the requested computing tasks;
   performing the optimization process when a number of queued requested computing tasks exceeds the optimization trigger number N, wherein the optimization process produces an updated data transfer schedule and an updated data process schedule for N queued requested computing tasks; and
   transmitting the updated data transfer schedule and the updated data process schedule to the one or more edge servers and the one or more connected vehicles.

15. The method of claim 14, wherein the current status information includes one or more of available memory, process capacity, data transfer capacity, a current data transfer schedule, and a current data process schedule.

16. The method of claim 14, wherein the requested computing tasks pertain to at least one of downloading data from the one or more edge servers and uploading vehicular sensor data from the one or more connected vehicles to the one or more edge servers.

17. The method of claim 14, wherein the optimization process includes:
   formulating a discrete state transition model that represents dynamics of different types of data being transferred among different network nodes and data being processed from one type to another as a function of a current data transfer schedule and a current data process schedule;
   formulating constraints representing resource limitations and task requirements using information including one or more of bandwidth limitations, available processor power, available memory, distances among the one or more edge servers and the one or more connected vehicles, future trajectory data pertaining to the one or more connected vehicles, and data destination information; and
   evaluating a cost function that accounts for the discrete state transition model and the constraints to produce the updated data transfer schedule and the updated data process schedule for the N queued requested computing tasks.

18. The method of claim 14, wherein the updated data transfer schedule includes a first set of tuples, each tuple in the first set of tuples including a rate of data transfer from a first network node to a second network node, and the updated data process schedule includes a second set of tuples, each tuple in the second set of tuples including a rate of data processing from a first type of data to a second type of data.

19. The method of claim 14, further comprising reducing the optimization trigger number N based, at least in part, on an urgency level associated with one or more of the queued requested computing tasks.

20. The method of claim 14, wherein each of the one or more edge servers is deployed in one of a roadside unit (RSU), an office environment, and a residential environment.

\* \* \* \* \*